US012132322B2

(12) United States Patent
Pmsvvsv et al.

(10) Patent No.: US 12,132,322 B2
(45) Date of Patent: Oct. 29, 2024

(54) ELECTROLYZER POWER CONVERSION

(71) Applicant: Bloom Energy Corporation, San Jose, CA (US)

(72) Inventors: Prasad Pmsvvsv, Sunnyvale, CA (US); Rakesh Roy, San Jose, CA (US); Soma Depuru, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/178,857

(22) Filed: Mar. 6, 2023

(65) Prior Publication Data
US 2023/0283081 A1 Sep. 7, 2023

Related U.S. Application Data

(60) Provisional application No. 63/316,964, filed on Mar. 4, 2022.

(51) Int. Cl.
*H02J 3/38* (2006.01)
*C25B 9/65* (2021.01)

(52) U.S. Cl.
CPC .............. *H02J 3/381* (2013.01); *C25B 9/65* (2021.01); *H02J 2207/20* (2020.01); *H02J 2300/26* (2020.01)

(58) Field of Classification Search
CPC .... H02J 3/381; H02J 2207/20; H02J 2300/26; C25B 9/65
See application file for complete search history.

(56) References Cited

U.S. PATENT DOCUMENTS

| 7,471,010 | B1 * | 12/2008 | Fingersh | F03D 9/11 |
| | | | | 290/43 |
| 9,722,422 | B2 * | 8/2017 | Jagota | H02J 1/10 |
| 2008/0217998 | A1 * | 9/2008 | Parmley | H02J 7/35 |
| | | | | 307/65 |
| 2009/0179493 | A1 * | 7/2009 | Yeh | H02J 1/102 |
| | | | | 307/64 |
| 2012/0267952 | A1 * | 10/2012 | Ballatine | H02J 7/34 |
| | | | | 307/26 |
| 2015/0112501 | A1 * | 4/2015 | Rombouts | H02J 3/14 |
| | | | | 700/295 |
| 2016/0241036 | A1 * | 8/2016 | Wolter | H02J 3/28 |
| 2016/0244890 | A1 * | 8/2016 | Petipas | C25B 9/73 |

(Continued)

FOREIGN PATENT DOCUMENTS

WO 2019246433 A1 12/2019

OTHER PUBLICATIONS

Extended European Search Report in corresponding European Application No. 23160187.3 dated Jul. 6, 2023.

*Primary Examiner* — Daniel Cavallari
*Assistant Examiner* — Brian K Baxter
(74) *Attorney, Agent, or Firm* — THE MARBURY LAW GROUP PLLC

(57) ABSTRACT

A power control device for an electrolyzer that is configured to receive electrical current from a plurality of electrical power sources, rectify alternating current from a first subset of the plurality of electrical power sources, convert direct current from a second subset of the plurality of electrical power sources, provide power from the first subset and the second subset of electrical power sources to an energy bus, and receive, at the electrolyzer, power from the energy bus.

18 Claims, 6 Drawing Sheets

200

110 DC Source with adjustable current (0 – $I_{rated}$)
121 DC Source with adjustable voltage (0 – $V_{rated}$)
122 DC Source with adjustable voltage (0 – $V_{rated}$)
123 DC Source with adjustable voltage (0 – $V_{rated}$)

201 Solid oxide electrolyzer stack
202 Stack heater
203 Air heater
204 Vaporizer 500 Electrical energy to stacks
501 Electrical energy to stack heater
502 Electrical energy to air heater
503 Electrical energy to vaporizer 600 Air input at ambient temperature
601 Hot air going to stacks area
602 liquid water
603 Steam (Super heater steam)

(56) References Cited

U.S. PATENT DOCUMENTS

| | | |
|---|---|---|
| 2021/0156039 A1 | 5/2021 | Ballantine et al. |
| 2021/0179451 A1* | 6/2021 | Ballantine ................. C25B 9/23 |
| 2021/0234372 A1* | 7/2021 | Inoue ..................... H02J 3/004 |
| 2021/0317588 A1 | 10/2021 | Falk et al. |
| 2022/0065162 A1 | 3/2022 | Tunt et al. |
| 2023/0084081 A1* | 3/2023 | Knobloch ................. H02J 1/14 |
| | | 307/82 |
| 2023/0279571 A1* | 9/2023 | Pmsvvsv ............... C25B 15/023 |
| | | 307/151 |

\* cited by examiner

200

300

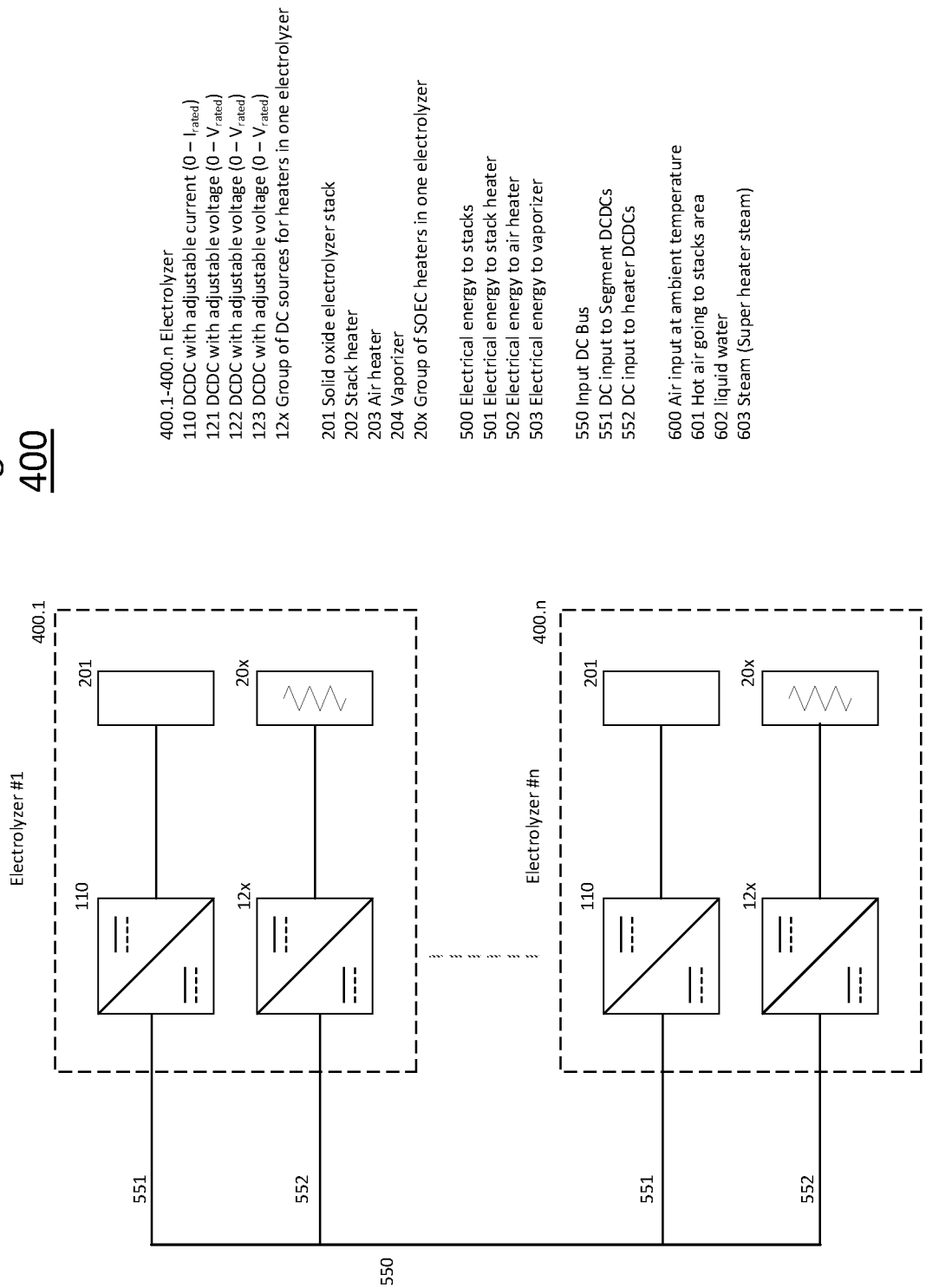

Fig. 4
400

400.1-400.n Electrolyzer
110 DCDC with adjustable current (0 – $I_{rated}$)
121 DCDC with adjustable voltage (0 – $V_{rated}$)
122 DCDC with adjustable voltage (0 – $V_{rated}$)
123 DCDC with adjustable voltage (0 – $V_{rated}$)
12x Group of DC sources for heaters in one electrolyzer 201 Solid oxide electrolyzer stack
202 Stack heater
203 Air heater
204 Vaporizer
20x Group of SOEC heaters in one electrolyzer 500 Electrical energy to stacks
501 Electrical energy to stack heater
502 Electrical energy to air heater
503 Electrical energy to vaporizer 550 Input DC Bus
551 DC input to Segment DCDCs
552 DC input to heater DCDCs 600 Air input at ambient temperature
601 Hot air going to stacks area
602 liquid water
603 Steam (Super heater steam)

600

ELECTROLYZER POWER CONVERSION

PRIORITY INFORMATION

This application claims the benefit of U.S. Provisional Patent Application No. 63/316,964 filed on Mar. 4, 2022, which is hereby incorporated by reference in its entirety.

FIELD OF THE INVENTION

The embodiments of the present invention generally relate to electrolyzer systems, and more particularly, to power conversion for electrolyzer systems.

BACKGROUND OF THE INVENTION

Electrolyzers are devices that consume electricity in order to produce hydrogen by splitting water molecules or other hydrocarbon fuel molecules. The input power source to the electrolyzer can be either a main grid (i.e., a utility grid), a microgrid, or a combination thereof. In general, the microgrid can be configured to include one or more distributed electrical resources (DERs), such as solar, wind, geothermal, hydro, storage, conventional, and the like. The main grid also can include several distributed power resources.

The electrical power system (EPS), whether it is a main grid or a microgrid, goes through various fluctuations caused by disruption in the balance between total generation power and total load power on the EPS network. Such fluctuations are increasingly present because of the intermittent nature of the power generated by renewable energy sources connected in the DERs. When the amount of power generation on the network is greater than the total load power, then the voltage and/or frequency of the power system increases. Similarly, when the total amount of load power is greater than the power generation, then voltage and/or frequency of the power system is reduced.

SUMMARY OF THE INVENTION

Accordingly, the embodiments of the present invention is directed to electrolyzer power conversion that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the electrolyzer power conversion includes a power control device for an electrolyzer that is configured to receive electrical current from a plurality of electrical power sources, rectify alternating current from a first subset of the plurality of electrical power sources, convert direct current from a second subset of the plurality of electrical power sources, provide power from the first subset and the second subset of electrical power sources to an energy bus, and receive, at the electrolyzer, power from the energy bus.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 4 illustrates a system having a second stage architecture for an electrolyzer with different power sources according to an example embodiment of the present invention.

DETAILED DESCRIPTION OF THE INVENTION

Figure 1:
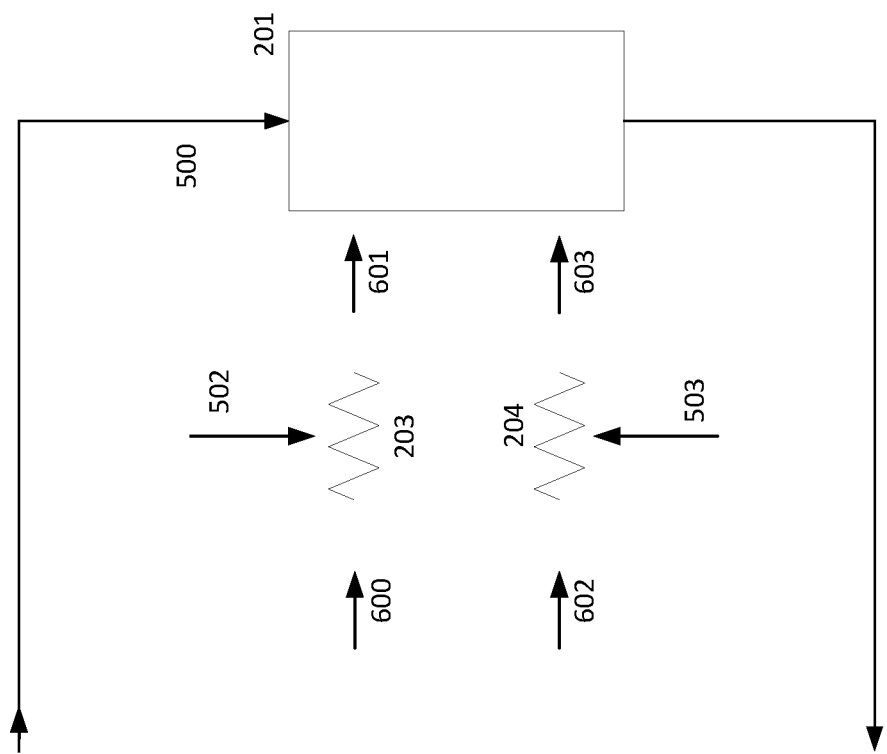
FIG. 1 illustrates an electrolyzer system having electrical loads according to an example embodiment of the present invention.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments of the invention or the claims.

Electrolyzers are devices that consume electrical energy and heat energy to produce hydrogen by splitting water molecules. The heat energy required by the electrolyzer can be produced from electrical energy internal to the electrolyzer. Alternatively, or additionally, heat energy can be supplied from an external source, typically through a byproduct of other processes, for example. In electrolyzers, where heat energy is derived from electrical energy, the total electrical energy required for electrolysis is the sum of electrical energy required for stacks as well as the electrical energy to produce required heat energy.

One or more power sources can be used for electrical energy. The input power source to the electrolyzer can be either a main grid (i.e., a utility grid), a microgrid, or a combination thereof. In general, the microgrid includes one or more distributed electrical resources (DERs), such as solar, wind, geothermal, hydro, storage (e.g., battery), conventional, and the like.

The electrical power system (EPS), whether it is a main grid or a microgrid, goes through various fluctuations caused by disruption in the balance between total generation power and total load power on the EPS network. Such fluctuations are increasingly present because of the intermittent nature of the power generated by renewable energy sources connected in the DERs. When the amount of power generation on the network is greater than the total load power, then the voltage and/or frequency of the power system increases. Similarly, when the total amount of load power is greater than the power generation, then voltage and/or frequency of the power system is reduced. In addition, the distributed power sources in the microgrid can be either AC coupled microgrid or DC coupled microgrid, or combination thereof, for example.

Accordingly, the inventors have developed an architecture that is flexible enough to accept variations in electrical power sources and loads without the need for customization at each site. The various embodiments implement electrical power conversion in two stages for electrolyzer power sources. Here, the rate of hydrogen production in electrolyzer plants is based on, and can be adjusted by, the conditions of input power sources.

In addition, the various embodiments provide a flexible electrical architecture to combine different combinations of electrical resources and to distribute that power to different loads by following pre-set priority levels. This architecture enables the addition and removal of different generator resources and loads without the need for customized solutions.

Power Requirements of Electrolysis

Electrolyzers, whether at low temperature or high temperature, utilize both electrical energy and heat energy to split the water molecules.

The low temperature electrolyzer generates heat energy utilized for the chemical reaction through the electrolyzer cell itself, i.e., through $I^2R$ losses in cells, where I is current and R is resistance. Therefore, separate heat energy is not supplied to stacks in some embodiments. However, the high temperature electrolyzer, such as the solid oxide electrolyzer (SOEC), utilizes additional heat energy to keep the stacks at the required high temperatures (e.g., greater than 750° C.). Also, the SOECs typically start operation with cell voltages much lower than thermo-neutral voltage such that additional heat energy is required to compensate for endothermic reactions in SOECs. This heat energy keeps the stack hot while compensating endothermic reactions, and can be brought from external sources and/or can be generated with electrical energy and heaters, such as stack heaters and air heaters.

Unlike the low temperature electrolyzer which takes liquid water as input, the high temperature electrolyzer SOEC requires steam as input. This can be achieved by getting steam directly from external sources and/or can be generated internal to the electrolyzer by using water heaters, such as a vaporizer.

The amount of or rate of hydrogen production is determined according to the amount of electrical energy (power) that is supplied to electrolyzer stacks. The power supplied to the stack is equal to electrolyzer stack voltage multiplied by current that is supplied to the electrolyzer stack. The stack voltage is in turn a function of stack current and other physical and chemical parameters. Since other physical and chemical parameters are kept constant during normal operation, the embodiments derive stack power that can be controlled by a single variable (i.e., stack current). In the embodiments, the various electrochemical systems may require additional power to cover balance of plant components, such as blowers, fans, valves, monitoring equipment etc.

FIG. 1 illustrates an electrolyzer system 100 having electrical loads according to an example embodiment of the present invention. System 100 depicts an example solid oxide electrolyzer system. Example electrical loads include heaters to keep stacks at required high temperatures inside the hotbox, heaters to covert liquid water to steam, the stack, and the balance of plant.

As illustrated in FIG. 1, system 100 includes solid oxide electrolyzer stack 201, stack heater 202, air heater 203, and vaporizer 204. Electrical energy to stacks 500 is supplied to SOEC stack 201. Electrical energy to stack heater 501 is supplied to stack heater 202. Electrical energy to air heater 502 is supplied to air heater 203, and electrical energy to vaporizer 503 is supplied to vaporizer 204. Air input 600 is supplied to air heater 203, at ambient temperature. Heated air 601 is supplied to the SOEC stacks 201. Liquid water 602 is supplied to vaporizer 204. Steam (or extraheated or superheated steam) is supplied to SOEC stacks 201.

In the various embodiments, the architecture is configured to support electrolyzers with or without air heaters and/or water heaters to keep SOEC stack 201 heated. The electrolyzer can optionally use one or more of stack, air, and water heaters internal to the electrolyzer. Alternatively, one or more of stack, air, and water heaters can be omitted when heat energy is provided from an external source.

Heater Control

There are multiple design methods to achieve temperature control inside the hotbox which hosts electrolyzer stack(s). One such method is to use a set of heaters to heat up the stack directly through radiation and use second set of heaters to heat up air and pass that hot air to stacks. This type of control using multiple heaters enables precise temperature control and thermal uniformity across the hotbox.

The heat energy generated by the heater is proportional to $I^2R$ or $V^2/R$, where I and V are heater current and voltage, and R is resistance of the heater element. The heater power supply designer can choose which parameter (i.e., V or I) to control the heater power. Here, both parameters are equivalents. In this disclosure, voltage control is described in some examples, but the embodiments are not so limited. The embodiments include both V and I control.

One technique to achieve variable voltage from fixed voltage is by using one or more silicon-controlled rectifiers (SCRs) with AC voltage. This may be used for low power applications, however, there are several disadvantages in using SCR based variable AC voltage sources in electrical applications such as flicker and poor power factor especially at light load. Another disadvantage is a large amount of available short circuit current as AC supply is usually utility grid so this high available short circuit can cause dangerously high arc flash energy inside the hotbox during short circuits.

Figure 2:
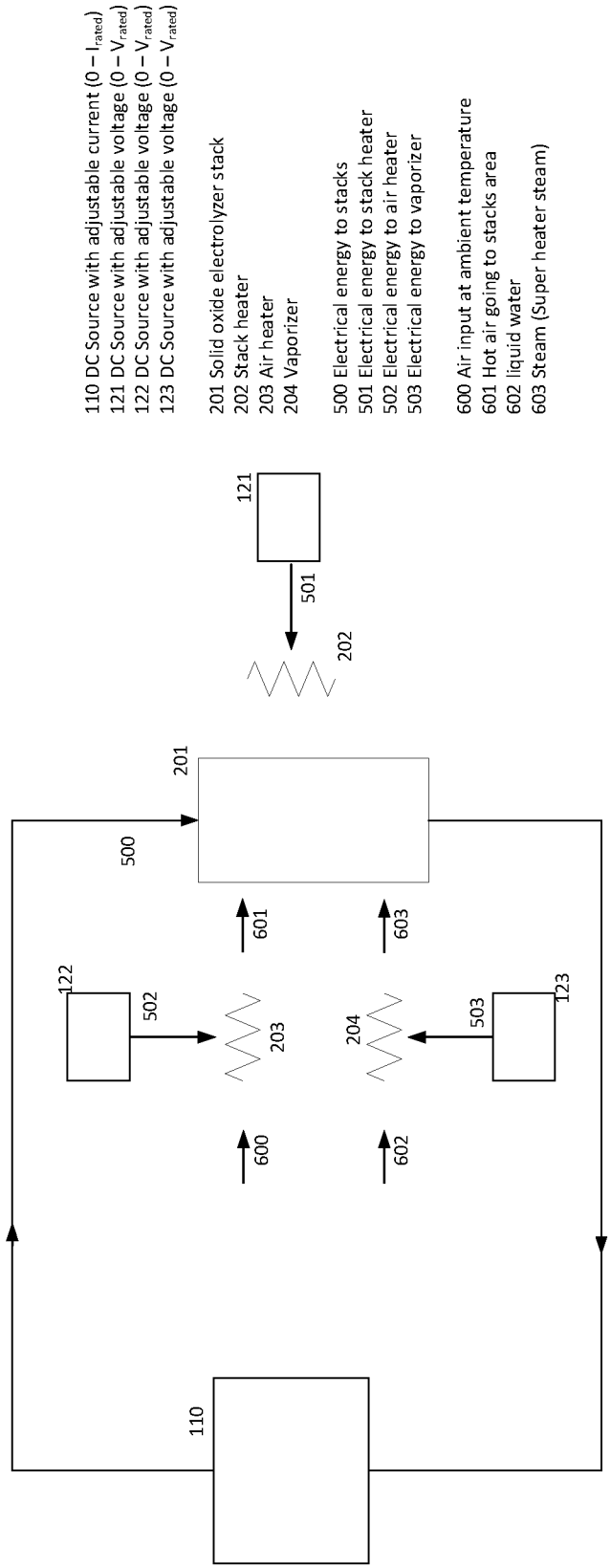
FIG. 2 illustrates a system having a plurality of DC power sources and a plurality of loads according to an example embodiment of the present invention.

FIG. 2 illustrates a system 200 having a plurality of DC power sources and a plurality of loads according to an example embodiment of the present invention. System 200 depicts an example solid oxide electrolyzer system. Here, heater power control is provided with an adjustable DC voltage. As illustrated in FIG. 2, system 200 includes a plurality of DC power sources, including DC source with adjustable current (0-$I_{rated}$) 110 for supplying SOEC stack 201, DC source with adjustable voltage (0-$V_{rated}$) 121 for supplying stack heater 202, DC source with adjustable voltage (0-$V_{rated}$) 122 for supplying air heater 203, and DC source with adjustable voltage (0-$V_{rated}$) 123 for supplying vaporizer 204.

Electrical energy to stacks 500 is supplied to SOEC stack 201. Electrical energy to stack heater 501 is supplied to stack heater 202. Electrical energy to air heater 502 is supplied to air heater 203, and electrical energy to vaporizer 503 is supplied to vaporizer 204. Air input 600 is supplied to air heater 203, at ambient temperature. Heated air 601 is supplied to the SOEC stacks 201. Liquid water 602 is supplied to vaporizer 204. Steam (or extraheated or superheated steam) is supplied to SOEC stacks 201.

Stack Power Control

The power supplied to the SOEC stack, and thus hydrogen production, is generally controlled by the controlling DC current flowing through the stack. Therefore, a DC power supply is required for stack in some embodiments.

First Stage Conversion: Electrical Power Sources to Electrolyzer Plant

The electrical power source to an electrolyzer plant can come from one or more sources. The utility grid is a common power source, however, there are several other sources such as a back-up engine generator, solar, wind, energy storage (e.g., battery), geothermal, hydro, etc. that can be electrically coupled to the main grid. The power resources can be AC coupled to the grid to provide one AC input to the electrolyzer plant, or the power resources can be multiple different AC sources or DC sources. In the various embodiments, a DC bus is used to which all power sources can be electrically connected through respective power converters.

Figure 3:
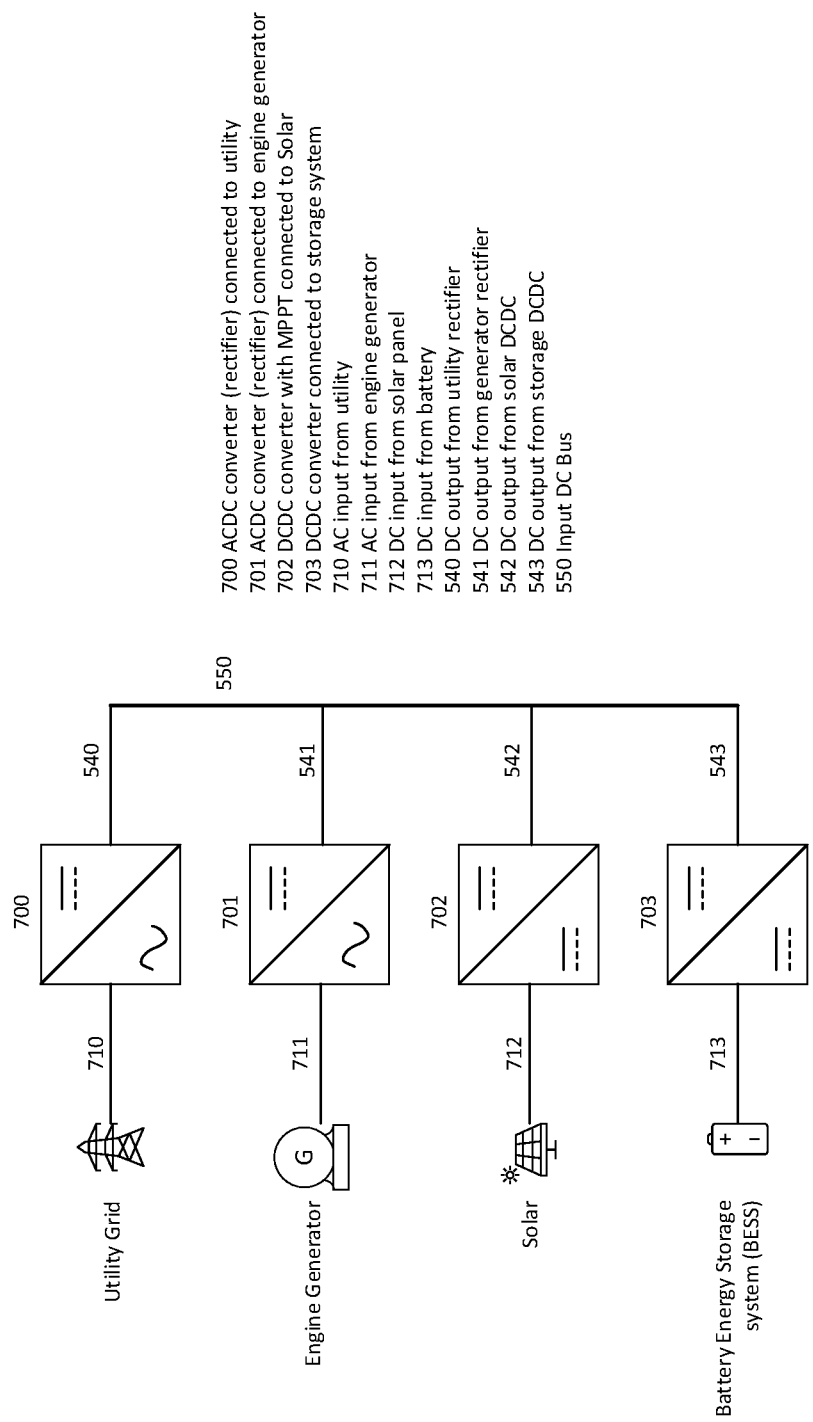
FIG. 3 illustrates a system having a first stage architecture for an electrolyzer with different power sources according to an example embodiment of the present invention.

FIG. 3 illustrates a system 300 having a first stage architecture for an electrolyzer with different power sources according to an example embodiment of the present invention.

As illustrated in FIG. 3, system 300 includes an ACDC converter (rectifier) connected to utility 700, an ACDC converter (rectifier) connected to engine generator 701, a DCDC converter with maximum power point tracking (MPPT) connected to solar 702, and a DCDC converter connected to storage system 703.

AC input from utility 710 is supplied to ACDC converter (rectifier) connected to utility 700. AC input from engine generator 711 is supplied to ACDC converter (rectifier) connected to engine generator 701. DC input from solar panel 712 is supplied to a DCDC converter with MPPT connected to solar 702. DC input from battery 713 is supplied to a DCDC converter connected to storage system 703.

ACDC converter (rectifier) connected to utility 700 supplies DC output from utility rectifier 540 to DC bus 550. ACDC converter (rectifier) connected to engine generator 701 supplies DC output from generator rectifier 541 to DC bus 550. DCDC converter with MPPT connected to solar 702 supplies DC output from solar DCDC 542 to DC bus 550. DCDC converter connected to storage system 703 supplies DC output from storage DCDC 543 to DC bus 550.

Different power sources can be connected to a common bus through ACDC converters (rectifiers) or through DCDCs converters depending upon the power source type. The utility and engine generators are AC sources that supply power to DC bus 550 through their corresponding rectifiers 700, 701 respectively. Solar and battery power sources are DC sources that supply power to DC bus 550 through DCDC converters 702, 703 respectively. The rectifiers and DCDCs connected to system DC bus 550 operate in parallel using various DC droop control methods. For example, various droop control methods are described in U.S. patent application Ser. No. 18/162,060, entitled GRID SUPPORTING ELECTROLYZER, filed 31 Jan. 2023, which is hereby incorporated by reference.

One or more additional power sources can be electrically coupled to the system DC bus 550 through an interface converter (e.g., rectifier or DCDC based on power source type) at any point of time during operation, as long as the output of the added converter tracks the DC droop control of remaining converters on the bus. Similarly, if some of the power resources are interrupted temporarily or for an extended period of time it can be done without adjusting design of remaining system.

Second Stage Conversion: Connecting Electrolyzers Loads to a Common DC Bus

FIG. 4 illustrates a system 400 having a second stage architecture for an electrolyzer with different power sources according to an example embodiment of the present invention.

As illustrated in FIG. 4, the electrical architecture with different loads from different electrolyzers are connected to one DC bus 550. Components of electrolyzers 400.1-400.$n$ are electrically coupled to DC Bus 550 by DC input to segment DCDCs 551 and DC input to heater DCDCs 552, for example.

Since voltage and currents required by each load are different from each other and different from the DC bus voltage, every load is connected to DC bus 550 through an interface DCDC converter. The DCDC converters are configured to provide variable voltage between 0 to full rated voltage or to provide variable current between 0 to full rated current depending upon the load requirements. The DCDCs also provide galvanic isolation between input and output. Since the electrolyzer stack 201 in each respective electrolyzer 400.1-400.$n$ is grounded, the gasolinic isolation helps avoid ground loops and also helps avoid high fault currents from different circuits passing through the electrolyzer stacks.

As illustrated in the FIG. 4, there can be N number of electrolyzers 400.1-400.$n$ connected to one DC bus 550 and each respective electrolyzer 400.1-400.$n$ can have one or more stacks and one or more stack DCDC converters, multiple heaters (e.g., 202, 203, 204, 20$x$) and its own DCDCs 12$x$. Multiple DCDCs may be connected to one heater or one DCDC can be connected to multiple heaters depending on the power requirements.

Additionally, this architecture enables the removal or addition of electrolyzer units as long as there is enough power on the bus to support the removal or addition of electrolyzers 400.1-400.$n$. Additionally, this architecture supports the removal or addition of heaters 12$x$ and heater power supplies 20$x$ depending on how heat energy is generated.

Two Stage of Power Conversion

Figure 5:
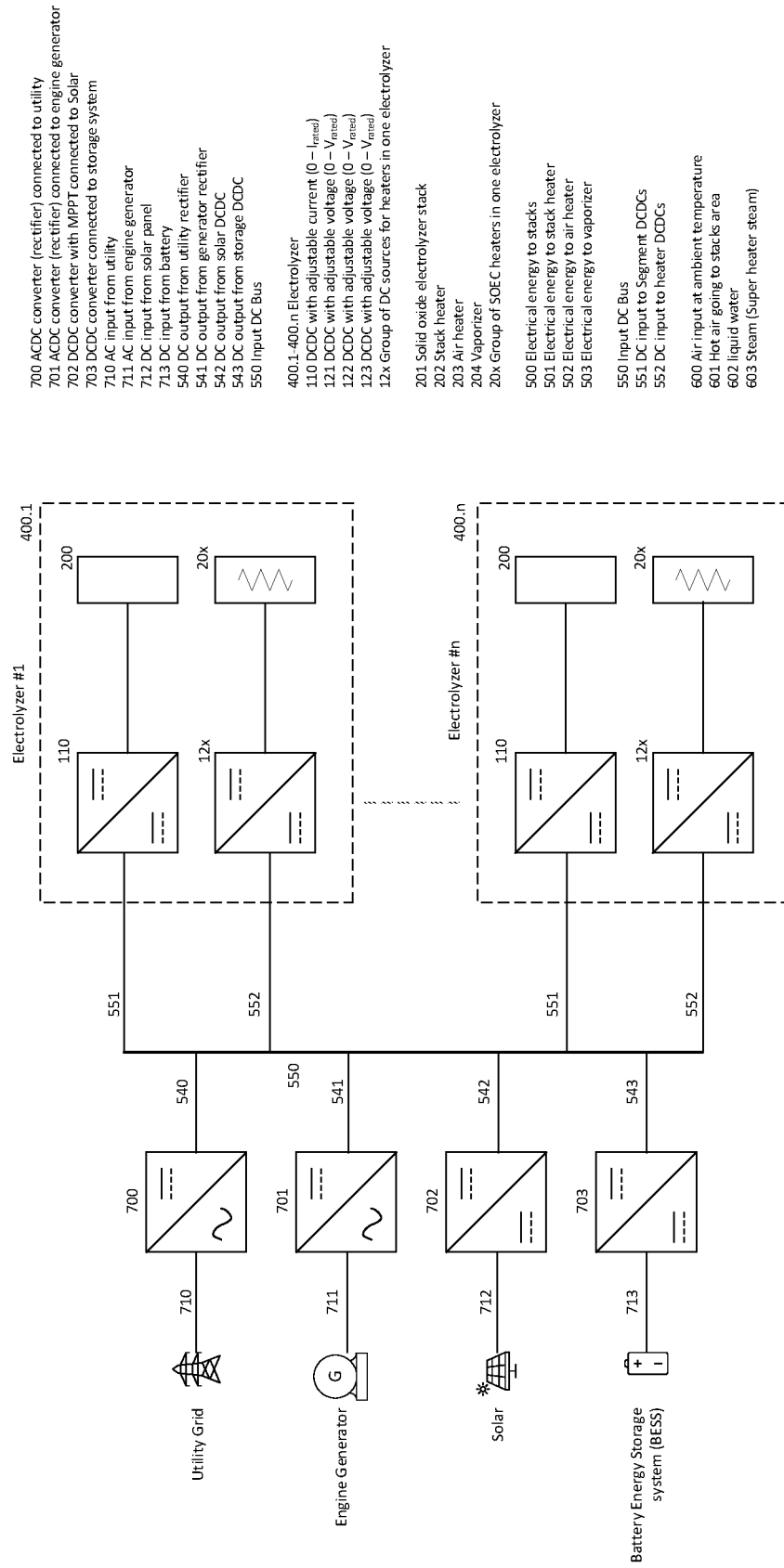
FIG. 5 illustrates a system having two-stage power conversion according to an example embodiment of the present invention.

FIG. 5 illustrates a system 500 having two-stage power conversion according to an example embodiment of the present invention. The elements of FIG. 5 are the same as those depicted and described in connection with FIGS. 1-4.

Prioritization of Loads

Frequent deep thermal cycles inside the SOEC hotbox can potentially accelerate degradation of SOEC stack. In order to avoid deep thermal cycles, the SOEC is kept at a predetermined high temperature as much as possible even when electrolyzers are not producing hydrogen.

Figure 6:
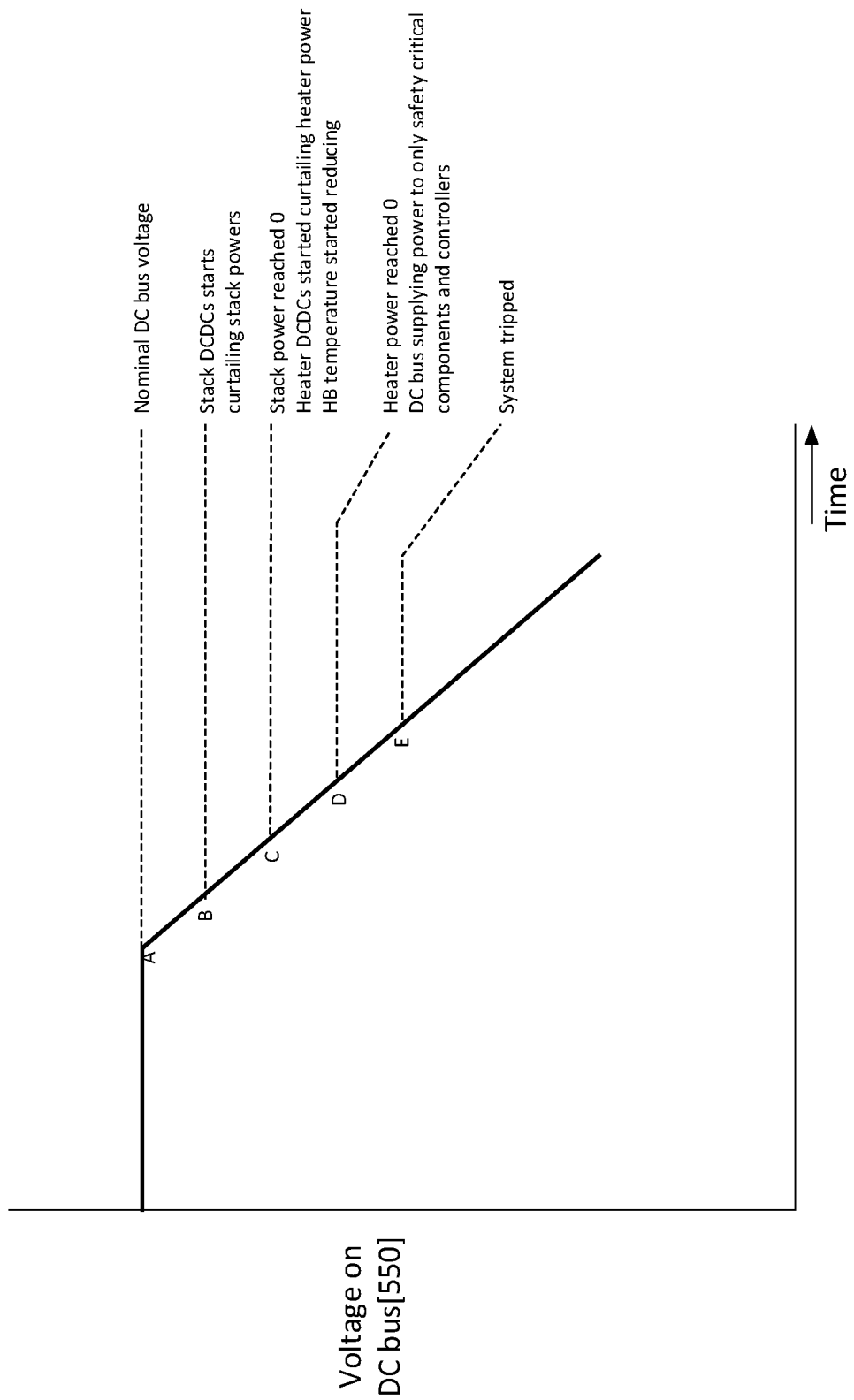
FIG. 6 illustrates power curtailment of stack DCDC and heater DCDC based on DC bus voltage.

FIG. 6 illustrates power curtailment of stack DCDC 100 and heater DCDC 12$x$ based on DC bus voltage.

When there is not enough power available on DC bus 550, priority is given to heaters over stack power and water heaters. The embodiments facilitate priority by programming droop characteristics in the connected loads. When voltage on DC bus 550 is dropping due to load-generation unbalance, the DCDC 110 in connected electrolyzers can determine that voltage at point 551 and reduce its power to the stack to help recover DC bus 550. If available voltage is still dropping, then stack power 500 can be completely reduced to zero before heater DCDCs 12$x$ resume operation.

Other electrolyzer manufacturers use single stage conversion which has a few inherent disadvantages such as isolation requirements, power factor issues, etc. The architecture described herein resolves the above-mentioned disadvantages as well as offers greater flexibility to add/remove different power sources and loads without the need for system redesign.

It will be apparent to those skilled in the art that various modifications and variations can be made in the electrolyzer power conversion of the present invention without departing from the spirit or scope of the invention. Thus, it is intended that the present invention cover the modifications and variations of this invention provided they come within the scope of the appended claims and their equivalents.

What is claimed is:

1. A power control device for an electrolyzer that is configured to:
   receive electrical current from a plurality of electrical power sources;
   rectify alternating current from a first subset of the plurality of electrical power sources;
   convert direct current from a second subset of the plurality of electrical power sources;
   provide power from the first subset and the second subset of electrical power sources to an energy bus; and
   receive, at the electrolyzer, power from the energy bus,
   wherein different load elements of the electrolyzer have different priority in response to a reduction in available power.

2. The power control device of claim 1, wherein the first subset of the plurality of electrical power sources includes an electrical grid.

3. The power control device of claim 2, wherein the electrical grid is a utility grid, a microgrid, or a combination thereof.

4. The power control device of claim 1, wherein the second subset of the plurality of electrical power sources includes a solar energy system or a battery energy storage system.

5. The power control device of claim 1, wherein a first stage is in advance of the energy bus and a second stage is supplied by the energy bus.

6. The power control device of claim 1, wherein load elements include an electrolyzer stack and at least one heater including at least one of a stack heater, an air heater, or a vaporizer.

7. The power control device of claim 6, wherein the at least one heater has higher priority than the electrolyzer stack.

8. The power control device of claim 6, wherein stack power is reduced to zero in response to a reduction in available power.

9. A power control method for an electrolyzer, the method comprising:
   receiving electrical current from a plurality of electrical power sources;
   rectifying alternating current from a first subset of the plurality of electrical power sources;
   converting direct current from a second subset of the plurality of electrical power sources;
   providing power from the first subset and the second subset of electrical power sources to an energy bus; and
   receiving, at the electrolyzer, power from the energy bus,
   wherein different load elements of the electrolyzer have different priority in response to a reduction in available power.

10. The power control method of claim 9, wherein the first subset of the plurality of electrical power sources includes an electrical grid.

11. The power control method of claim 10, wherein the electrical grid is a utility grid, a microgrid, or a combination thereof.

12. The power control method of claim 9, wherein the second subset of the plurality of electrical power sources includes a solar energy system or a battery energy storage system.

13. The power control method of claim 9, wherein a first stage is in advance of the energy bus and a second stage is supplied by the energy bus.

14. The power control method of claim 9, wherein load elements include an electrolyzer stack and at least one heater including at least one of a stack heater, an air heater, or a vaporizer.

15. The power control method of claim 14, wherein the at least one heater has higher priority than the electrolyzer stack.

16. The power control method of claim 14, wherein stack power is reduced to zero in response to a reduction in available power.

17. A power control device for an electrolyzer that is configured to:
   receive electrical current from a plurality of electrical power sources;
   rectify alternating current from a first subset of the plurality of electrical power sources;
   convert direct current from a second subset of the plurality of electrical power sources;
   provide power from the first subset and the second subset of electrical power sources to an energy bus; and
   receive, at the electrolyzer, power from the energy bus,
   wherein different load elements of the electrolyzer have different priority in response to a reduction in available power and wherein the load elements of the electrolyzer are prioritized according to droop characteristics programmed at respective load elements.

18. A power control method for an electrolyzer, the method comprising:
   receiving electrical current from a plurality of electrical power sources;
   rectifying alternating current from a first subset of the plurality of electrical power sources;
   converting direct current from a second subset of the plurality of electrical power sources;
   providing power from the first subset and the second subset of electrical power sources to an energy bus; and
   receiving, at the electrolyzer, power from the energy bus,
   wherein different load elements of the electrolyzer have different priority in response to a reduction in available power and wherein the load elements of the electrolyzer are prioritized according to droop characteristics programmed at respective load elements.

* * * * *